W. B. NIMMO AND C. S. SWAIM.
AUTOMOBILE LOCK.
APPLICATION FILED AUG. 18, 1919.

1,341,925.                                         Patented June 1, 1920.

WITNESS:

INVENTORS,
W. B. Nimmo,
C. S. Swaim
BY
ATTORNEYS

UNITED STATES PATENT OFFICE.

WILLIAM B. NIMMO, OF SANTA ANA, AND CHARLES S. SWAIM, OF LONG BEACH, CALIFORNIA; SAID SWAIM ASSIGNOR OF HIS RIGHT TO JESSE C. NIMMO, OF LOS ANGELES, CALIFORNIA.

AUTOMOBILE-LOCK.

1,341,925.   Specification of Letters Patent.   Patented June 1, 1920.

Application filed August 18, 1919. Serial No. 318,386.

*To all whom it may concern:*

Be it known that we, WILLIAM B. NIMMO and CHARLES S. SWAIM, citizens of the United States, residing at Santa Ana and Long Beach, respectively, in the counties of Orange and Los Angeles, respectively, and State of California, have invented new and useful Improvements in Automobile-Locks, of which the following is a specification.

Our invention relates to automobile locks and consists of the novel features herein shown, described and claimed.

Our object is to make an automobile lock which may be readily mounted upon the steering post to engage the steering wheel and hold the steering wheel inoperative.

Figure 1:
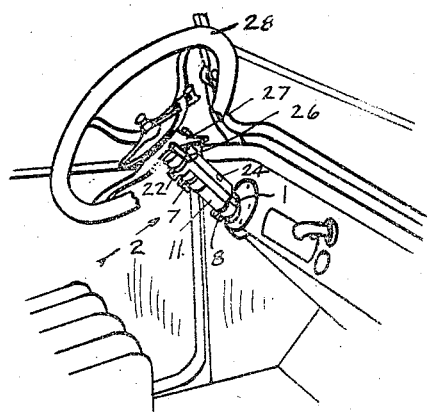
Figure 1 is a fragmentary perspective showing an automobile lock embodying the principles of our invention in use.
Figures 2, 3:
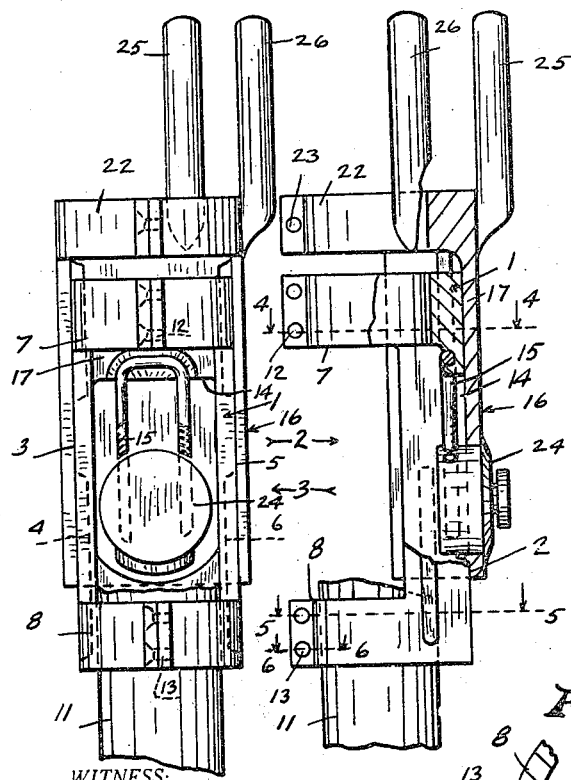
Fig. 2 is a front elevation of the lock as seen looking in the direction indicated by the arrows 2 in Figs. 1 and 3.
Fig. 3 is a sectional elevation looking in the direction indicated by the arrow 3 in Fig. 2.
Figure 4:
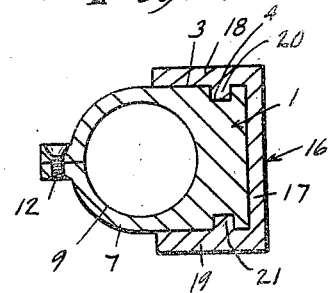
Fig. 4 is a horizontal cross section on the line 4—4 of Fig. 3.
Figure 5:
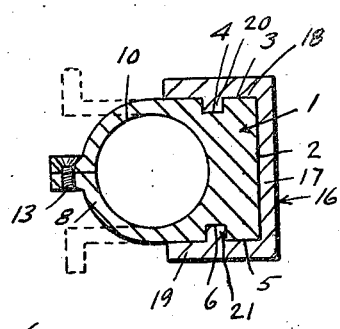
Fig. 5 is a horizontal cross section on the line 5—5 of Fig. 3.
Figure 6:
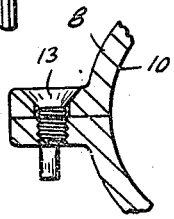
Fig. 6 is a fragmentary sectional detail on the line 6—6 of Fig. 3.

The rigid block 1 has a flat outer face 2, a flat side face 3 with a groove 4, and a flat side face 5 with a groove 6. The faces 3 and 5 are at right angles to the face 2, and the grooves 4 and 6 are in planes parallel with the face 2.

The split bearings 7 and 8 extend from the ends of the block 1 and have circular openings 9 and 10 in alinement with each other, and the steering post casing 11 fits tightly in the openings 9 and 10, and the bearings 7 and 8 are clamped upon the post 11 by screws 12 and 13 tapped through flanges extending from the bearings and upset or riveted so that the screws cannot be easily removed and so as to rigidly fix the block 1 upon the steering post.

A rectangular opening 14 is formed through the center of the rigid block 1. The U-shaped locking bar 15 is recessed into the inner face of the rigid block 1 above the opening 14 and the two arms of the bar extend downwardly into the opening 14.

The sliding block 16 has a central portion 17 fitting the face 2 of the rigid block, and side portions 18 and 19 fitting the faces 3 and 5 of the rigid block, and tongues 20 and 21 fitting the grooves 4 and 6 of the rigid block.

A split bearing 22 is formed integral with the upper end of the sliding block 16 and fits loosely upon the steering post 11 above the split bearing 7 and has a screw 23 inserted through flanges extending from the bearing on opposite sides of the split and upset or riveted so that the bearing cannot be removed.

A combination lock 24 is mounted through the sliding block 16 in position to extend into the opening 14, and so that when the sliding block 16 is elevated the prongs of the locking bar 15 will enter the lock and be locked in place by manipulating the lock, and so that when the lock is properly manipulated the sliding bar may be moved downwardly.

The arms 25 and 26 are formed integral with the upper end of the sliding block 16 and the bearing 22 and extend upwardly in parallel positions, so that when the sliding block 16 is moved upwardly a spoke 27 of the steering wheel 28 will pass between the arms 25 and 26 and the arms will hold the steering wheel from being manipulated to operate the automobile.

Thus we have produced an automobile lock consisting of a block adapted to be rigidly mounted upon a steering post casing, a block slidingly mounted upon the rigid block and carrying a fork adapted to engage a spoke of the steering wheel, and means for locking the sliding block to the rigid block.

Various changes may be made without departing from the spirit of our invention as claimed.

We claim:

1. In an automobile lock, a block adapted to be fixed positively upon a steering post casing having grooves in its side faces, a second block slidably mounted upon the first block having tongues fitting the grooves of the first block, a fork extending upwardly integral with the sliding block adapted to straddle a spoke of a steering wheel, and means for locking the second block to the first block in a raised position.

2. An automobile lock comprising a block adapted to be positively mounted upon a steering post casing, a lock member carried by the rigid block, the rigid block having grooves in its side faces, a second block having tongues adapted to slidably fit the grooves of the first block and having an upwardly extending fork adapted to engage a spoke of a steering wheel, and a second lock member carried by the sliding block and adapted to engage the lock member of the first block.

In testimony whereof we have signed our names to this specification.

WILLIAM B. NIMMO.
CHARLES S. SWAIM.